United States Patent
Du et al.

(10) Patent No.: US 8,564,949 B2
(45) Date of Patent: Oct. 22, 2013

(54) FLIP-TYPE PORTABLE ELECTRONIC DEVICE WITH AUTOMATIC OPEN ANGLE ADJUSTING FUNCTION

(75) Inventors: Bin Du, Shenzhen (CN); Wen-Rong Chen, New Taipei (TW); Hui Li, Shenzhen (CN); Cong Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/216,247

(22) Filed: Aug. 24, 2011

(65) Prior Publication Data

US 2012/0188692 A1    Jul. 26, 2012

(30) Foreign Application Priority Data

Jan. 24, 2011   (CN) .......................... 2011 1 0025729

(51) Int. Cl.
*G06F 1/16*       (2006.01)
(52) U.S. Cl.
USPC .................................................. 361/679.55
(58) Field of Classification Search
USPC .................................................. 361/679.55
See application file for complete search history.

(56) References Cited

U.S. PATENT DOCUMENTS

| | | | | |
|---|---|---|---|---|
| 6,437,974 B1* | 8/2002 | Liu | .......................... | 361/679.27 |
| 7,502,221 B2* | 3/2009 | Fuller et al. | .............. | 361/679.55 |
| 7,608,791 B2* | 10/2009 | Kung et al. | ................. | 200/61.62 |
| 7,903,143 B2* | 3/2011 | Seddik et al. | ............ | 348/207.99 |
| 8,004,833 B2* | 8/2011 | Tseng et al. | ............. | 361/679.55 |
| 8,023,262 B2* | 9/2011 | Ligtenberg et al. | ...... | 361/679.55 |
| 2003/0002244 A1* | 1/2003 | Mitev | ............................ | 361/683 |
| 2006/0002072 A1* | 1/2006 | Sutton et al. | .................. | 361/683 |
| 2009/0244832 A1* | 10/2009 | Behar et al. | .............. | 361/679.55 |
| 2010/0246119 A1* | 9/2010 | Collopy et al. | .......... | 361/679.55 |

* cited by examiner

*Primary Examiner* — Lisa Lea Edmonds
(74) *Attorney, Agent, or Firm* — Altis & Wispro Law Group, Inc.

(57) ABSTRACT

A portable electronic device includes a main body, a flip cover, and a hinge assembly. The flip cover is rotatably fixed on the main body via the hinge assembly. The hinge assembly includes a sensing module, a hinge mechanism, and a microcontroller. The sensing module is configured to detect control signals. The hinge mechanism is configured to control an angle between the flip cover and the main body. The microcontroller is electrically connected to the sensing module. The microcontroller receives the control signals from the sensing module, and controls the hinge mechanism to rotate to a specified angle according to the control signals. The angle between the flip cover and the main body is automatically adjusted correspondingly.

15 Claims, 8 Drawing Sheets

FLIP-TYPE PORTABLE ELECTRONIC DEVICE WITH AUTOMATIC OPEN ANGLE ADJUSTING FUNCTION

BACKGROUND

1. Technical Field

Embodiments of the present disclosure relate to flip-type portable electronic devices, and more particularly to a flip-type portable electronic device with an automatic open angle adjusting function.

2. Description of Related Art

Flip-type portable electronic devices include a main body and a flip cover rotatably fixed on the main body. Viewing angle of a screen of the flip cover can be inconvenient to see when a user needs to adjust the flip cover to get a better viewing angle of the screen. What is needed, therefore, is an easily adjustable flip-type portable electronic device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as in an EPROM. It will be appreciated that module may comprise connected logic units, such as gates and flip-flops, and may comprise programmable units, such as programmable gate arrays or processors. The module described herein may be implemented as a hardware module or a software module that may be stored in any type of computer-readable medium or other computer storage device.

In the exemplary embodiments, the portable electronic device could be a mobile phone, a notebook computer or any other type of flip-type portable electronic devices. In the following embodiments a notebook computer is illustrated as an example.

Figure 1:
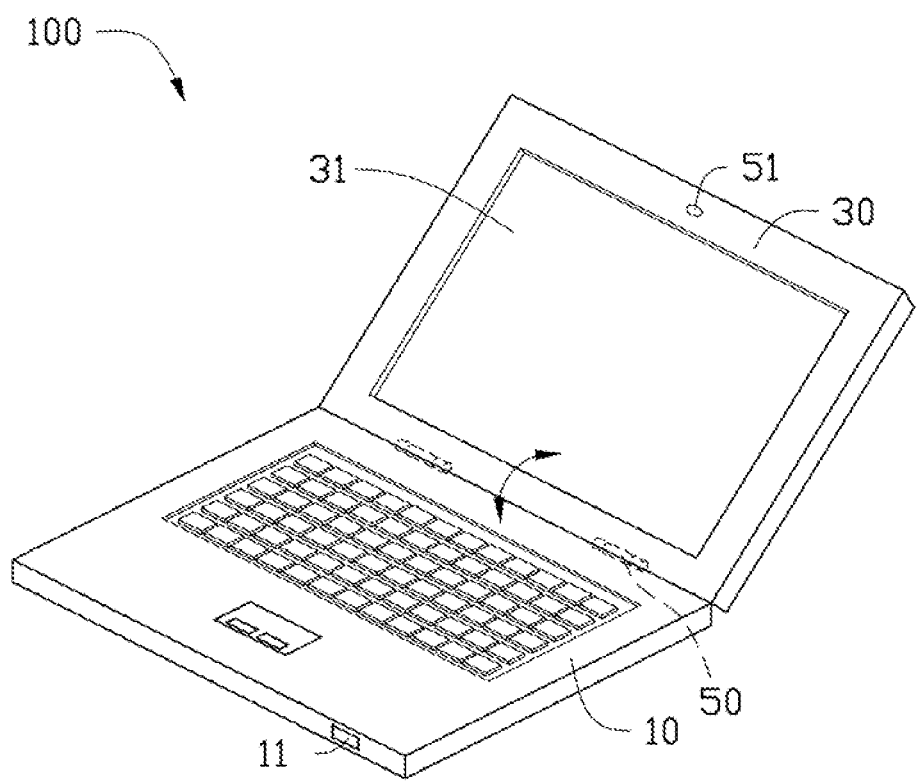
FIG. 1 is a schematic view of a portable electronic device, according to a first exemplary embodiment.

FIG. 1 is a schematic view of a notebook computer 100 including a main body 10 and a flip cover 30, according to a first exemplary embodiment. In the following embodiments, the notebook computer 100 is configured to automatically adjust angle between the body 10 and the cover 30, to adjust viewing angle of a screen 31 on an inside portion of the cover 30 without having to manually adjust the cover 30. The computer 100 further includes a hinge assembly 50. The cover 30 is rotatably fixed on the body 10 via the hinge assembly 50. The cover 30 can be opened to a preferred viewing angle relative to the body 10. The hinge assembly 50 can automatically adjust the angle between the cover 30 and the body 10 according to predetermined parameters.

Figure 2:
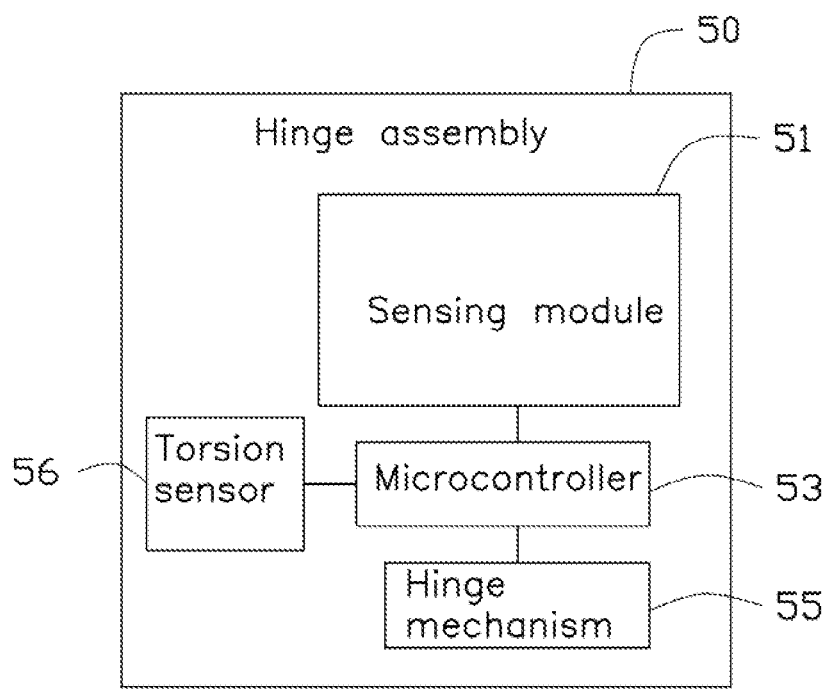
FIG. 2 is a block diagram of one embodiment of the hinge assembly in the portable electronic device of FIG. 1.

Also referring to FIG. 2, the hinge assembly 50 includes a sensing module 51, a microcontroller 53 electrically connected to the sensing module 51, and a hinge mechanism 55. The sensing module 51 is used to detect control signals, and send the control signals to the microcontroller 53. The microcontroller 53 controls the hinge mechanism 55 to rotate a specified angle corresponding to the control signals, to adjust the angle between the cover 30 and the body 10.

Figure 3:
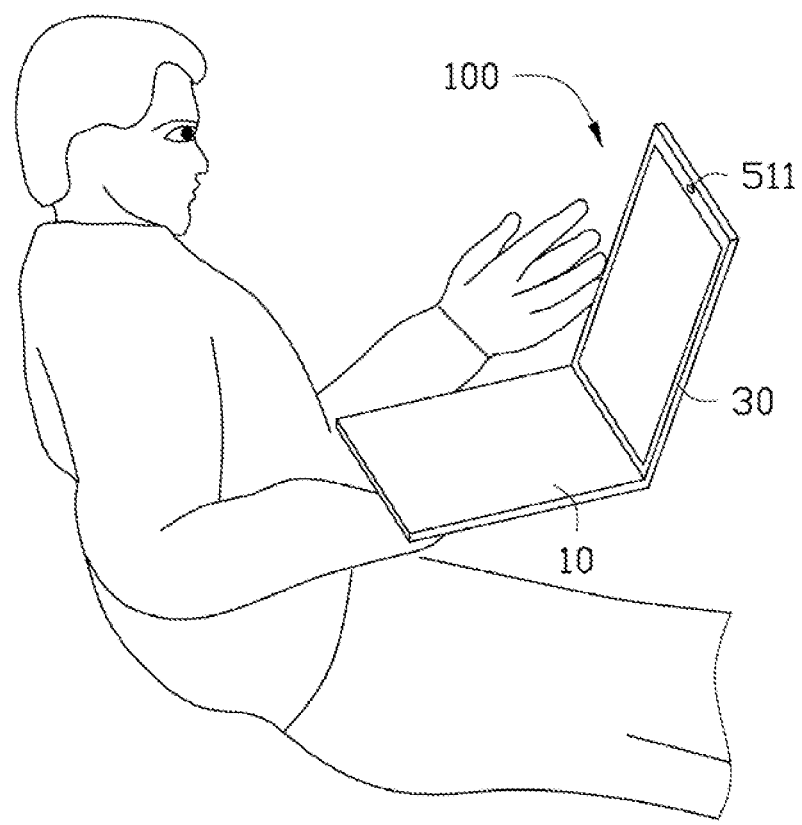
FIG. 3 is a schematic view of the portable electronic device of FIG. 1 in use.

Referring to FIG. 3, in this exemplary embodiment, the sensing module 51 includes a camera 511. The camera 511 is positioned on the cover 30 to face a head of a user using the computer 100. The sensing module 51 captures real-time images of an object such as the head of the user via the camera 511 (or some other body part in alternate embodiments), and then sends the images to the microcontroller 53.

Figure 4:
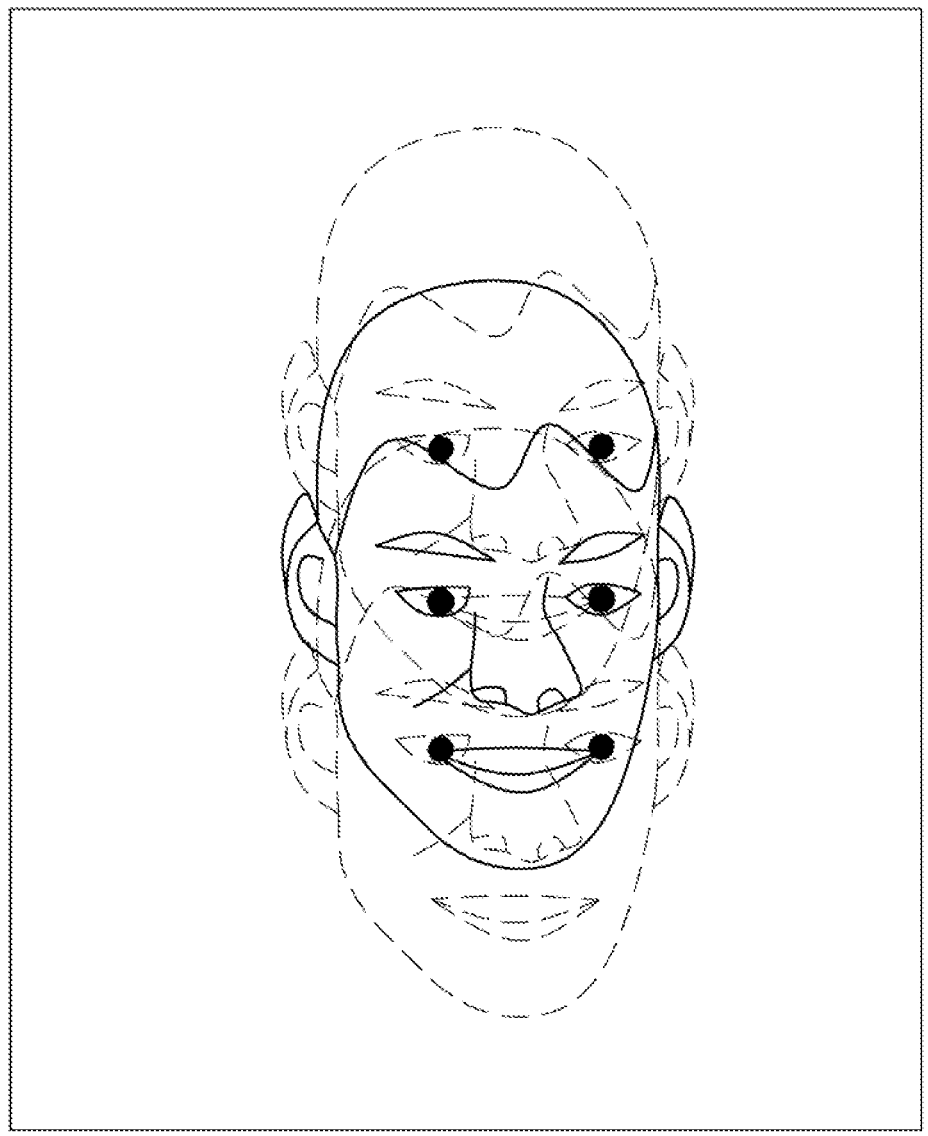
FIG. 4 is a schematic view of images captured by sensing module of the portable electronic device of FIG. 1

Referring to FIG. 4, the microcontroller 53 is capable of determining whether a head of the user is in the middle of the captured image, and controlling the hinge mechanism 55 to adjust the angle between the cover 30 and the main body 10 correspondingly, so that the head will be in the middle of a next captured image. In detail, if the head in the image is nearer to the upper side of the captured image, the microcontroller 53 controls the hinge mechanism 55 to open the cover 30 further to increase the angle, until the head in the captured image is in the middle of a captured image. Alternatively, if the head in the image is nearer to the lower side of the captured image, the microcontroller 53 controls the hinge mechanism 55 to adjust the cover 30 closer to the body 10 to decrease the angle, until the head is in the middle of a next captured image.

In this exemplary embodiment, when the computer 100 is turned off or enters a standby mode such as a sleeping state, the microcontroller 53 automatically controls the hinge mechanism 55 to close the cover 30. In addition, the microcontroller 53 can remember the angle the cover 30 was set at before closing the cover 30. When the computer 300 is used again the cover 30 can be automatically returned to the remembered angle. Additionally, a switch 11 can be included that returns the cover 30 to the remembered angle when the switch 11 is operated by a user. In other embodiments the switch 11 can be configured to set the cover 30 to previously determined angles when operated by a user.

The hinge assembly 50 further includes a torsion sensor 56 mounted in a position on the outer surface of the cover 30, so that it can provide feedback if an obstacle should block movement of the cover 30. The torsion sensor 56, which is electrically connected to the microcontroller 53, is configured to measure resistance to rotation of the cover 30, and protect the computer 100 from damage. In detail, the sensor 56 can measure resistance of the cover 30 when the hinge assembly 50 is automatically opening the cover 30 and an obstacle behind the computer 100 blocks movement of the cover 30. Any resistance exceeding a specified resistance, the sensor 56 activates the microcontroller 53 to stop the hinge mechanism 55 from trying to open the cover 30 any further.

Figure 5:
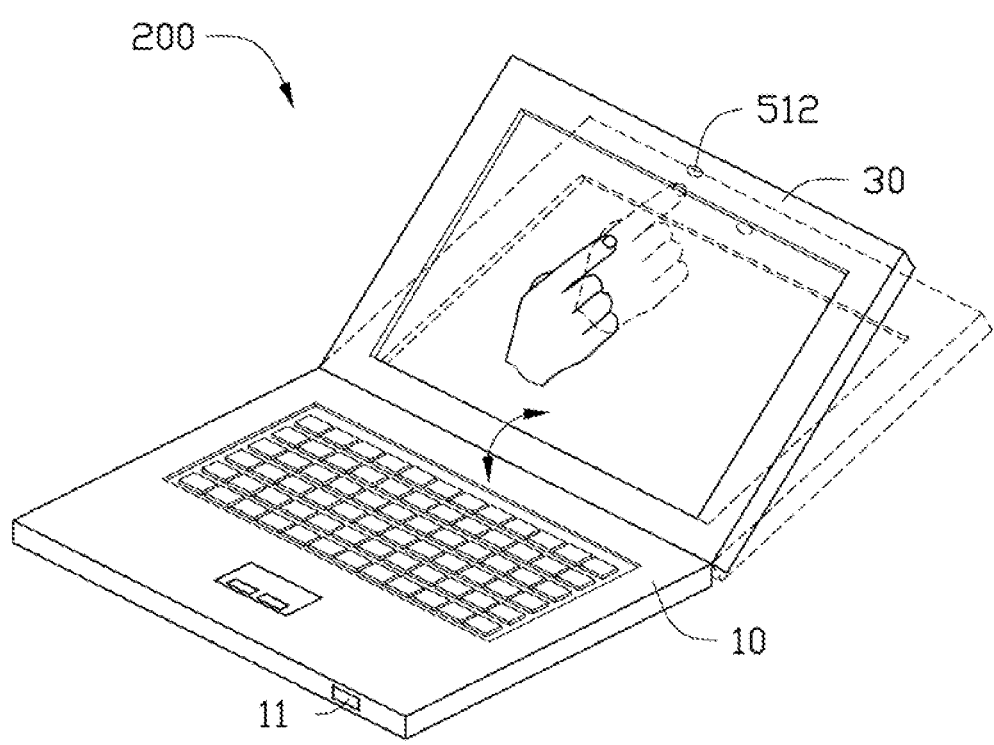
FIG. 5 is a schematic view of a portable electronic device during adjustment, according to a second exemplary embodiment.
Figure 6:
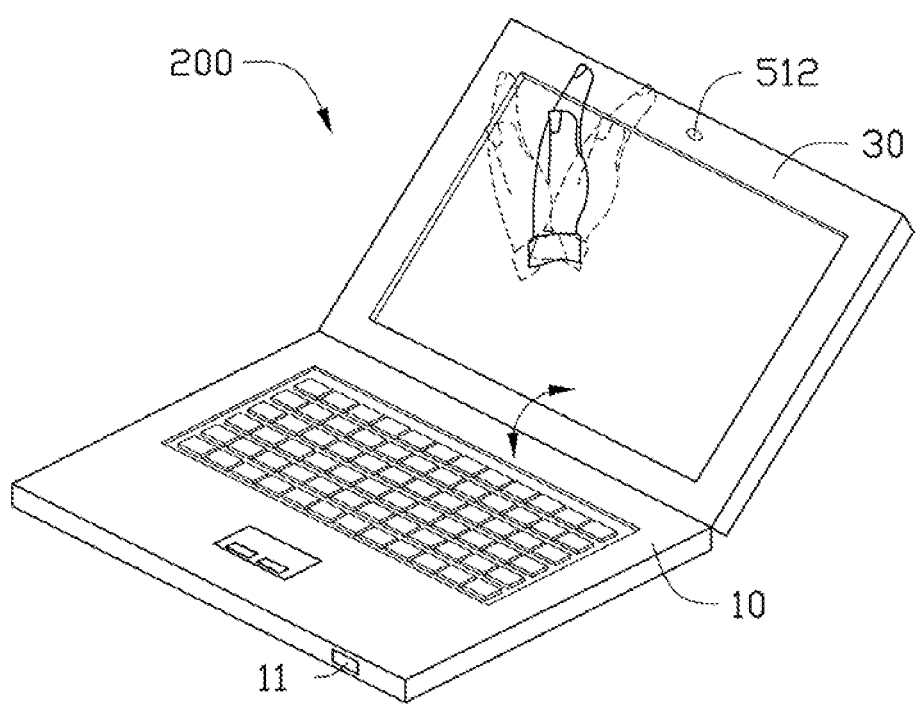
FIG. 6 is similar to FIG. 4, but showing the portable electronic device during another adjustment.

FIG. 5 and FIG. 6 show a notebook computer 200, according to a second exemplary embodiment, differing from the computer 100 only in that the sensing module 51 includes an infrared (IR) sensor 512. The IR sensor 512 is mounted on the cover 30 that will ensure a sense of an IR emission source facing the computer 100, such as a body part of a user, for example. The IR sensor 512 is electrically connected to the microcontroller 53, and can be configured to sense IR signals from a limited distance such as a few centimeters or even half a meter, for example. The IR sensor 512 senses movement such as a hand of a user approaching, leaving, moving to left, or moving to right within the limited distance. When the hand or any other IR emission source makes a movement in a distinct manner within the limited distance, associated functions can be performed, such as adjusting the cover 30. For example, hand movement toward or away from the sensor 512 could cause the angle of the cover 30 to be increased or decreased. Hand movement toward left or right could be associated with paging forward or back in a document displayed on the screen 31. In other embodiments of course other commands or functions may be associated with the various possible hand movements made within the limited distance.

Figure 7:
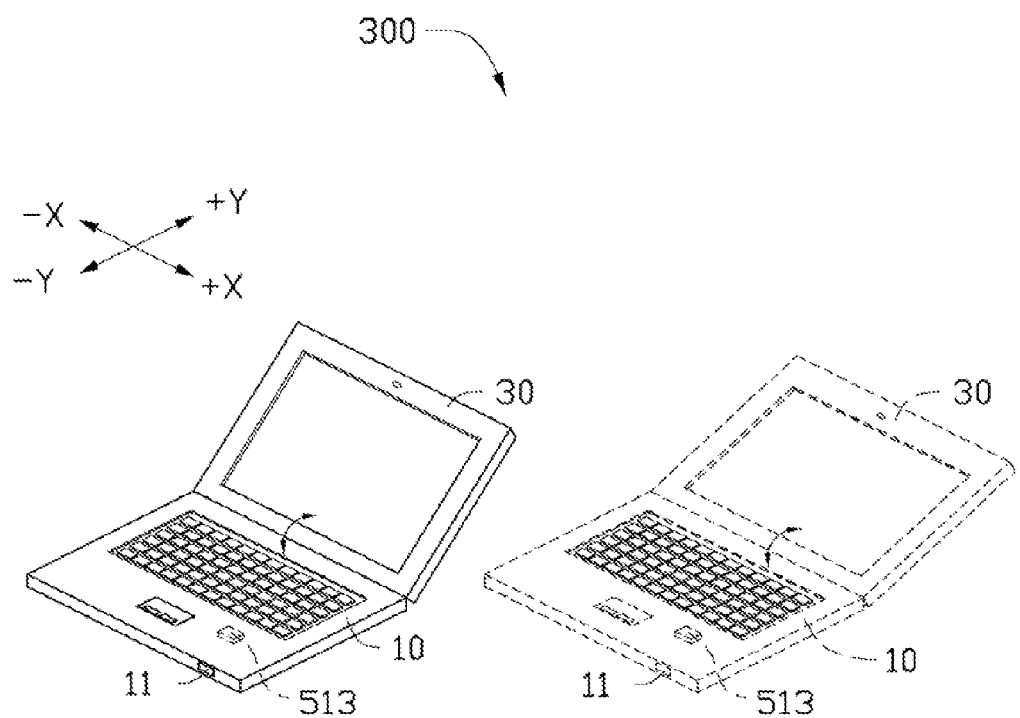
FIG. 7 is a schematic view of a portable electronic device during adjustment, according to a third exemplary embodiment.

FIG. 7 shows a notebook computer 300, according to a third exemplary embodiment, differing from the computer 100 in that the sensing module 51 includes an accelerometer 513. The accelerometer 513 is electrically connected to the microcontroller 53, which is configured to detect acceleration of the computer 300. When a user moves the computer 300 along the +Y direction, the −Y direction, the −X direction, or the +X direction associated functions or actions are performed such as those given as an example in the second embodiment above. For example, when a user move the computer 300 along the +Y direction shown in the FIG. 6, the accelerometer 513 detects the acceleration along the +Y direction, and activates the microcontroller 53 to control the hinge assembly 50 to further open the cover 30 a predetermined angle.

Figure 8:
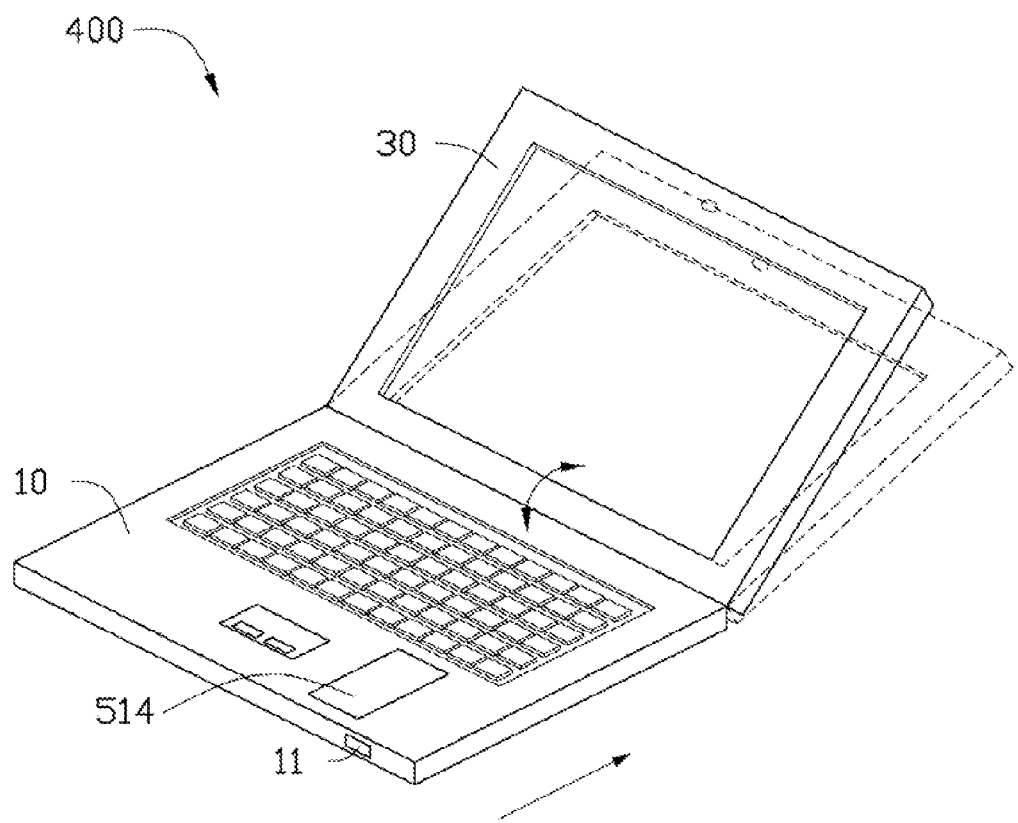
FIG. 8 is a schematic view of a portable electronic device during adjustment, according to a fourth exemplary embodiment.

FIG. 8 shows a notebook computer 400, according to a fourth exemplary embodiment, differing from the computer 100 in that the sensing module 51 includes a touch pad 514. The touch pad 514 is electrically connected to the microcontroller 53. The touch pad 514 is positioned on the body 10 and configured to recognize distinctive sliding touches of a finger of a user which may be associated with functions or actions as mentioned in the second and third embodiments. The sliding touches may include, for example, a sliding down to up touch along the arrow points in FIG. 7, a sliding up to down touch, a sliding right to left touch, and a sliding left to right touch.

In the exemplary embodiments, the portable electronic device detects control signals timely via the sensing module 55, and sends the control signals to the microcontroller 53. Thereafter, the microcontroller 53 automatically controls the hinge mechanism 55 to adjust the angle between the cover 30 and the body 10 corresponding to the control signals, to provide a better viewing angle, rather than requiring manual adjustment, and additional signals can be recognized so that other functions or actions can be triggered making the portable electronic device more convenient to use.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a main body;
   a flip cover rotatably fixed on the main body;
   a hinge assembly configured to hinge the main body and the flip cover, comprising:
      a sensing module;
      a hinge mechanism configured to control an angle between the flip cover and the main body; and
      a microcontroller electrically connected to the sensing module, receiving control signals from the sensing module, and controlling the hinge mechanism to rotate to a specified angle according to the control signals, to adjust the angle between the flip cover and the main body.

2. The portable electronic device of claim 1, wherein the sensing module includes a camera, the sensing module is configured to send the control signals according to real-time images of a body part of a user using the portable electronic device, captured by the camera, and send the images to the microcontroller.

3. The portable electronic device of claim 2, wherein the microcontroller is capable of determining whether the body part of the user is in the middle of the captured images, and controlling the hinge mechanism to adjust the angle between the flip cover and the main body correspondingly, until a head of the user is in the middle of a next captured image.

4. The portable electronic device of claim 1, wherein the sensing module includes an infrared (IR) sensor configured to detect IR signals as the control signals.

5. The portable electronic device of claim 4, wherein the IR sensor is configured to sense IR signals from a limited distance, when the IR sensor senses any IR emission source makes a movement in a distinct manner within the limited distance, the portable electronic device performs corresponding function or actions.

6. The portable electronic device of claim 5, wherein when the IR sensor senses an IR emission source movement toward the IR sensor, the angle between the flip cover and the main body is increased.

7. The portable electronic device of claim 5, wherein when the IR sensor senses an IR emission source movement away from the IR sensor, the angle between the flip cover and the main body is decreased.

8. The portable electronic device of claim 5, wherein when the IR sensor senses an IR emission source movement toward left, paging forward of a document displayed on a display screen of the flip cover is associated.

9. The portable electronic device of claim 5, wherein when the IR sensor senses an IR emission source movement toward right, paging back of a document displayed on a display screen of the flip cover is associated.

10. The portable electronic device of claim 1, wherein the sensing module is an accelerometer configured to detect acceleration of the portable electronic device as the control signals.

11. The portable electronic device of claim 1, wherein when the accelerometer detects the portable electronic device has an acceleration in different directions, the portable electronic device performs corresponding function or actions.

12. The portable electronic device of claim 1, wherein the sensing module is a touch pad, configured to recognize distinctive sliding touches of a finger of the user, and trigger the portable electronic device performing corresponding function or actions.

13. The portable electronic device of claim 1, wherein when the portable electronic device is turned off or enters a standby mode, the microcontroller automatically controls the hinge mechanism to close the flip cover.

14. The portable electronic device of claim 13, wherein the microcontroller remembers a previous angle of the flip cover before closing the flip cover, and automatically returns the flip cover to the previous angle when the portable electronic device is used again.

15. The portable electronic device of claim 1, wherein the hinge assembly further includes a torsion sensor configured to provide feedback to the microcontroller, to stop the hinge mechanism from opening the flip cover pass the specified angle.

\* \* \* \* \*